T. I. DUFFY.
SPRING SUSPENSION FOR VEHICLES.
APPLICATION FILED MAR. 14, 1919.
1,381,623.
Patented June 14, 1921.
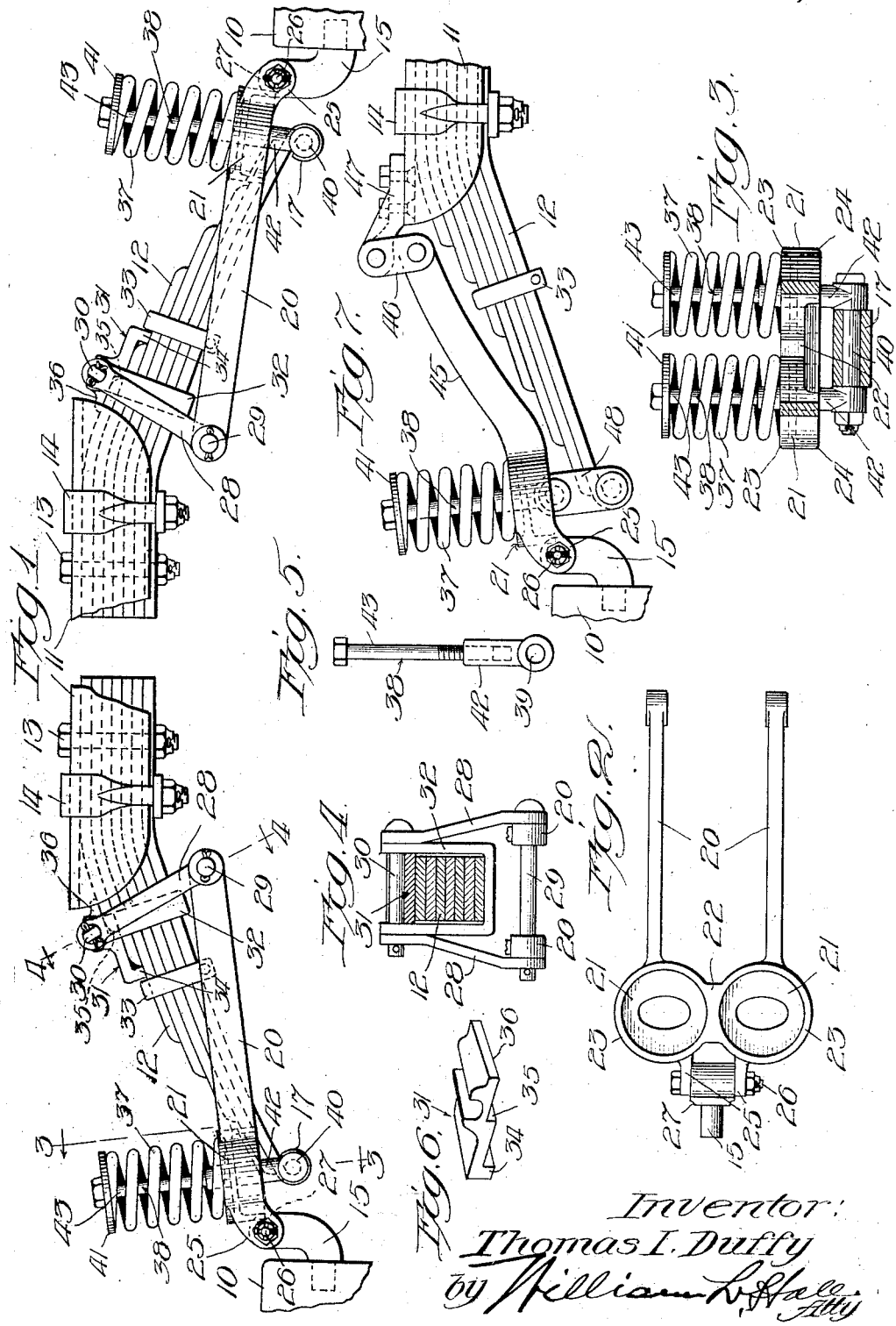

UNITED STATES PATENT OFFICE.

THOMAS I. DUFFY, OF CHICAGO, ILLINOIS, ASSIGNOR TO WALTER S. BURGESS, OF CHICAGO, ILLINOIS.

SPRING SUSPENSION FOR VEHICLES.

1,381,623.  Specification of Letters Patent.   Patented June 14, 1921.

Application filed March 14, 1919. Serial No. 282,564.

*To all whom it may concern:*

Be it known that I, THOMAS I. DUFFY, a citizen of the United States, and a resident of Chicago, in the county of Cook and State of Illinois, have invented certain new and useful Improvements in Spring Suspensions for Vehicles, and I do hereby declare that the following is a full, clear, and exact description thereof, reference being had to the drawings, and to the characters of reference marked thereon, which form a part of this specification.

This invention relates to improvements in springing for vehicles and refers more specifically to a novel auxiliary spring device designed to coöperate with the regular springing elements of the vehicle to absorb the relatively lighter and faster road shocks and assist the main springing elements to take the more severe shocks and also to control the recoil action of the vehicle springing.

The present invention has been designed with more particular reference to the relatively stiff springs of trucks adapted for carrying heavy loads, and particularly with respect to the springs which are made quite stiff to support a large portion of the truck load and to provide a construction wherein auxiliary springs, made of a desired relatively small stock, may be designed to operate delicately to absorb the fast vibrations of the vehicle or those which have little tendency to elongate the main spring and at the same time of such strength as to coöperate with the main springs under heavy loads. Other objects of the invention are to simplify and improve spring suspensions of this character and to adapt them to the regular vehicle springs in the space afforded for auxiliary springs.

The invention consists in the combination and arrangement of the parts shown in the drawings and described in the specification and is pointed out in the appended claims.

In the drawings;

Figure 1 is a rear, broken view of a truck springing embodying my invention, showing a portion of the axial assembly on which the springing is directly supported and a portion of the body frame.

Fig. 2 is a top plan view of one of the auxiliary spring levers at one side of the vehicle and parts associated therewith, the auxiliary springs being omitted.

Fig. 3 is a section on the line 3—3 of Fig. 1.

Fig. 4 is a section on the line 4—4 of Fig. 1.

Fig. 5 is a detail of one of the auxiliary spring hangers.

Fig. 6 is a detail of the spring lever supporting pad.

Fig. 7 is a fragmentary view showing a modification.

As shown in the drawings, 10, 10 designate the brake housings of the rear axle assembly of the vehicle, and 11 designates a portion of the vehicle subject to rebound, it comprising, as herein shown, a transverse channel member constituting part of the body structure. 12, 12 designates two quarter semi-elliptical springs that are seated at their upper stub ends in the channel member 11 and are secured thereto by the bolts 13 and clips 14. 15, 15 designate perches which are carried by the brake housings 10 of the axle assembly. The shock absorbing and anti-recoil spring device of the spring suspension is constructed to be operatively inserted between the spring eye 17 and said perch.

20, 20 designate the two arms of a lever that are formed integral with a pair of seats 21, 21, said seats being connected by an integral web 22. The seats 21 are surrounded by upstanding auxiliary spring retaining flanges 23, and the casting is strengthened by depending flanges 24. Extending outwardly from said seats are lugs or ears 25 which are apertured to receive hinge bolts 26 that extend therethrough and through the apertures of the heads 27 of the perches 15, whereby the double armed levers are hinged to said perches to swing vertically.

The inner ends of said levers, shown in Fig. 1, extend inwardly toward the center of the vehicle, with the arms of each lever lying, one at each side of the plane of its associated spring 12. The levers are supported at their inner ends from the part of the vehicle subject to rebound by means of pairs of links 28, the links of each pair being arranged one at each side of the spring. They are hinged at their lower ends, as by pins 29, to the arms 20 and are apertured at their upper ends to receive pins 30 which lie across and are supported on pads 31 which, in turn, are supported on the springs 12 at the ends of the body member 11, said pads being recessed on their upper side to receive said bolts. In order to prevent said links rising away from the springs 12 the pins 30 are extended through openings in the upper ends of the arms of U-shaped yokes 32 (Fig. 4), the closed members of which extend across the bottoms of the springs and the arms of which extend up along the side faces of the pads 31. The pads 31 may be held from shifting lengthwise of the spring by being disposed between the spring ties 33 and the end of one of the upper leaves of the spring. As shown, the pads are provided with downturned flanges 34 that lie between the ties 33 and the ends of the next upper spring leaves and are provided with shoulders 35 that lie against the ends of the topmost leaves, the inner ends 36 of the pads extending inwardly and overlying the said topmost leaves.

Each pair of spring seats 21 receive and support auxiliary spiral springs 37, through the medium of which springs the outer ends of the main springs 12 are yieldingly supported on the outer ends of the double arm levers. The means for supporting said main springs thus yieldingly from the levers comprise rods or hangers 38 which are formed at their lower ends to provide eyes 39 to receive shackle bolts 40 that pass through the spring eyes, or the hangers, if desired, support the springs through shackle links. The upper or headed ends of the bolts extend through washers 41 that lie on the upper ends of the auxiliary springs. As herein shown, each said hangers 33 is made of two parts (Fig. 5), a hollow, threaded lower member 42 in which the eye 39 is formed and an upper member 43 that is threaded at its lower end to engage internal threads of the eye members 42.

In Fig. 7 is shown a modification in which the double arm lever 45 is disposed wholly above the spring 12 and is carried at its inner end by links 46 that are hinged to a bracket 47 which may be fixed in any suitable manner to the cross member 11 of the body frame. In the construction shown in Fig. 7 the end of the main spring 12 is carried on the spring hangers 38 through the medium of a shackle 48. In other respects the structure shown in Fig. 7 is generally like that shown in Fig. 1 and similar parts bear like reference characters.

The main rear springs used in trucks and like vehicles of the character mentioned are usually made comparatively stiff, inasmuch as the rear springs sustain the principal part of the load, and they are usually flexed or elongated only by a substantial portion of the rated load. It is desirable that the auxiliary spring devices which coöperate with the main springs to yieldingly carry the lighter loads and take the faster vibrations, be made to have a considerable ultimate or closing strength as a whole, while being capable of freely yielding to absorb the faster spring movement or vibrations. It is also desirable that the auxiliary spring device be of such construction and design as to occupy a small amount of space and to present a neat appearance in the spring assembly. The double arm lever construction shown permits the arms of the lever to be adapted to the spring ends and to overlap them inwardly so as to require but little added space for the auxiliary attachment, and the provision of twin spring seats to receive a pair of auxiliary springs permits of the use of auxiliary springs that are sufficiently lively to absorb the faster road shocks and vibrations, and also to be of sufficient strength when the coils close toward each other to properly graduate the elasticity of the combined spring structure to produce smooth riding action throughout the range of movement of the springing. Moreover, the construction described permits the use of two auxiliary springs of sizes designed for and adapted to single spring shock absorbing and anti-recoil devices for the heavy duty of truck springing so that it thereby becomes practical for a manufacturer to produce shock absorbing and anti-recoil spring devices for both the heavy duty work of trucks and the relatively lighter work of pleasure cars with a single design of the auxiliary spring described.

In the use of the springing described, the lighter loads are carried to the axle through the auxiliary springs and the load shocks for the lighter loads are absorbed thereby with little or no deflection or elongation of the main springs. When the vehicle is more heavily loaded the weight of the load acts through the auxiliary springs on the main springs to flex or elongate the same after the coils of the auxiliary springs have been partially closed upon each other, so that the spring action in heavier loads, due to the combined action of the auxiliary and main springs, is a smooth graduated action. By reason of the fact that the main springs 12 are connected at their relatively thin ends directly to the auxiliary springs through the hangers 38, said spring ends are capable of some torsion in action so that, in the event one auxiliary spring is stiffer than the other the capacity of the spring ends to slightly twist accommodates the main springs to compensate for the irregular action of different strength auxiliary springs.

The length of the double arm levers is such, relatively to their points of suspension on the body, that both the inner body suspension links assume downwardly and inwardly oblique angles. This relative obliquity of two pairs of links operates in opposition to each other to hold the body from side sway relatively to the chassis.

While the structural details have been described with considerable particularity, it will be understood that the invention is not limited to the particular embodiment shown except as to claims wherein said details are specifically set forth and as imposed by the prior art.

I claim as my invention:

1. Spring suspension for vehicles comprising, in combination, an axle assembly, a vehicle portion subject to rebound, and spring means supporting said vehicle portion from the axle assembly comprising a main spring, a pair of auxiliary springs at each end of and connected to the main spring, with the springs of each pair laterally spaced relatively to the longitudinal axis of the main spring, and inwardly extending lever means to sustain said main spring on said axle assembly through said auxiliary springs.

2. Spring suspension for vehicles comprising, in combination, an axle assembly, a main spring, a two armed lever hinged to the axle assembly, with the arms thereof overlapping and disposed in planes at the sides of the axis of the main spring, and movably supported at its inner end by a vehicle part subject to rebound, and resilient connections at the sides of the main spring between said main spring and said lever.

3. Spring suspension for vehicles comprising, in combination, an axle assembly, a main spring, a two armed lever hinged to the axle assembly and movably supported at its inner end by a vehicle part subject to rebound, with the arms thereof overlapping and disposed in planes at the sides of the axis of the main spring, and resilient connections between said main spring and intermediate portions of the arms of said lever.

4. Spring suspension for vehicles comprising, in combination, an axle assembly, a main spring, a two armed lever hinged to the axle assembly and movably supported at its inner end by a part of the vehicle subject to rebound, with the arms thereof overlapping and disposed in planes at the sides of the axis of the main spring, spring seats on said lever spaced across the axis of the main spring, and coiled auxiliary springs operatively interposed between said seats and the end of said main spring.

5. Spring suspension for vehicles comprising, in combination, an axle assembly, a main spring, a two armed lever hinged to the axle assembly and movably supported at its inner end by a vehicle part subject to rebound, with the arms thereof overlapping and disposed in planes at the sides of the axis of the main spring, spring seats on and intermediate the ends of said lever and spaced across the axis of the main spring, coiled springs on said seats and connections between said coiled springs and the end of the main spring.

6. Spring suspension for vehicles comprising, in combination, an axle assembly, a main spring, a body supported thereon, a lever hinged to the axle assembly and extending in the same direction as the main spring and movably supported at its inner end and provided with twin spring seats in planes at opposite sides of the axis of the main spring, auxiliary coiled springs supported on said seats, and connections between said auxiliary springs and the end of the main spring.

7. Spring suspension for vehicles comprising, in combination, an axle assembly, a main leaf spring, a lever hinged to the axle assembly and formed with two spring seats on opposite sides of the axis of the main spring, a pair of coiled auxiliary springs supported on said seats, a pair of hangers for connecting said auxiliary springs to the main spring, and a support for the inner end of said lever movable relatively to said main spring.

8. Spring suspension for vehicles comprising, in combination, an axle assembly, a main spring, a two armed lever hinged to the axle assembly, with the arms thereof overlapping and in planes at the sides of the axis of said main spring, auxiliary springs carried by said lever intermediate its ends, direct connections between said auxiliary springs and the end of said main spring, and shackles connecting the inner ends of the two armed lever to a part of the vehicle subject to rebound.

9. Spring suspension for vehicles comprising, in combination, an axle assembly, a main spring, a lever hinged to the axle assembly, seats on said levers to sustain auxiliary springs; auxiliary springs supported on said seats, connections between said auxiliary springs and the end of said main spring, a pad supported on the main spring, and links hinged to the inner end of said lever and to a pin extending across and supported on said pad.

10. Spring suspension for vehicles comprising, in combination, an axle assembly, a main spring, a two-armed lever hinged to the axle assembly, with the arms thereof overlapping and in planes at the sides of the axis of said main spring, auxiliary springs carried by said lever intermediate its ends, connections between said auxiliary springs and the end of said main spring, a pad supported on the main spring, a pin extending across and supported on said pad, and shackles supporting the inner end of said lever from the ends of said pin.

11. Spring suspension for vehicles comprising, in combination, an axle assembly, a main spring, a lever hinged to the axle assembly and provided with laterally spaced seats, auxiliary springs sustained on said seats, connections between said auxiliary springs and the end of said main spring, a pad supported on the main spring, a pin extending across and supported on said pad, a tie member embracing said main spring for holding said pin from rising, and shackles supporting the inner ends of said lever from said pin.

12. Spring suspension for vehicles comprising, in combination, an axle assembly, a main spring, a two-armed lever hinged to the axle assembly, with the arms thereof overlapping and in planes at the sides of the axis of said main spring, auxiliary springs carried by said lever intermediate its ends, connections between said auxiliary springs and the end of said main spring, a pad supported on the main spring, a pin extending across and supported on said pad, a U-shaped member embracing said spring and provided at the ends of its arms with apertures for the passage of said pin, and shackles for supporting the inner end of said arms from said pin.

13. Spring suspension for vehicles comprising in combination, an axle assembly, a main spring, a two armed lever hinged to the axle assembly, with the arms thereof overlapping and disposed in planes at the sides of the axis of the main spring, resilient connections at the sides of the main spring between said spring and said lever, a pad supported on the main spring and having projections which interlock with a spring tie and some of the leaves of the main spring, and links for suspending the inner ends of said lever from said pad.

In testimony whereof I claim the foregoing as my invention, I hereunto append my signature at Chicago, Illinois, this 1st day of February, 1919.

THOMAS I. DUFFY.